（12） United States Patent
Phan et al.

(10) Patent No.: US 9,749,895 B2
(45) Date of Patent: Aug. 29, 2017

(54) FACILITATING IN-BEARER QOS DIFFERENTIATION IN MULTI-CONNECTIVITY 5G NETWORKS

(71) Applicant: NOKIA TECHNOLOGIES OY, Espoo (FI)

(72) Inventors: Vinh Van Phan, Oulu (FI); Ling Yu, Espoo (FI); Anand Bedekar, Buffalo Grove, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 77 days.

(21) Appl. No.: 14/732,414

(22) Filed: Jun. 5, 2015

(65) Prior Publication Data
US 2016/0360439 A1 Dec. 8, 2016

(51) Int. Cl.
H04W 28/02 (2009.01)
H04L 12/26 (2006.01)
H04W 28/12 (2009.01)
H04L 29/06 (2006.01)
H04W 28/10 (2009.01)

(52) U.S. Cl.
CPC ......... H04W 28/0268 (2013.01); H04L 43/08 (2013.01); H04L 69/14 (2013.01); H04W 28/10 (2013.01); H04W 28/12 (2013.01)

(58) Field of Classification Search
None
See application file for complete search history.

(56) References Cited

U.S. PATENT DOCUMENTS

| 9,154,994 | B2 * | 10/2015 | Fox | H04W 28/08 |
| 2008/0123660 | A1 | 5/2008 | Sammour et al. | |
| 2014/0010207 | A1 | 1/2014 | Horn et al. | |
| 2014/0347983 | A1 * | 11/2014 | Griot | H04W 28/0289 370/230 |

(Continued)

FOREIGN PATENT DOCUMENTS

| EP | 2 375 658 A1 | 10/2011 |
| WO | 2013123467 A1 | 8/2013 |
| WO | WO 2014/110410 A1 | 7/2014 |

OTHER PUBLICATIONS

3GPP TR 23.705 V13.0.0, "3rd Generation Partnership Project; Technical Specification Group Services and System Aspects; Study on System Enhancements for User Plane Congestion Management (Release 13)", (Dec. 2014), 61 pages.

(Continued)

*Primary Examiner* — Hong Cho
(74) *Attorney, Agent, or Firm* — Squire Patton Boggs (US) LLP

(57) ABSTRACT

Various communication systems may benefit from a high quality of service (QoS). For example, fifth generation (5G) wireless communication systems may benefit from differentiated service flows in the user plane that may impact a core network. According to certain embodiments, a method can include determining at a serving radio access network whether a modification of a service flow will impact at least one of a core network service monitoring, controlling, and configuring, and initiating, based on the determination, the modification of the service flow directly with a user equipment or through a controlling network entity located in the core network.

19 Claims, 4 Drawing Sheets

(56) References Cited

U.S. PATENT DOCUMENTS

| 2015/0043535 | A1* | 2/2015 | Ogura | H04W 88/12 |
| | | | | 370/331 |
| 2015/0222549 | A1* | 8/2015 | Kakadia | H04L 47/18 |
| | | | | 370/231 |
| 2016/0044530 | A1* | 2/2016 | Cheng | H04W 28/0289 |
| | | | | 370/235 |

OTHER PUBLICATIONS

European Search Report dated Oct. 31, 2016 corresponding to European Patent Application No. 16168705.8.
ETSI TS 123 203 V12.6.0 (Sep. 2014), Technical Specification, Digital Cellular Telecommunications System (Phase 2+); Universal mobile Telecommunications System (UMTS); LTE; Policy and charging control architecture (3GPP TS 23.203 version 12.6.0 Release 12), XP055312978.

\* cited by examiner

FACILITATING IN-BEARER QOS DIFFERENTIATION IN MULTI-CONNECTIVITY 5G NETWORKS

BACKGROUND

Field

Various communication systems may benefit from a high quality of service (QoS). For example, fifth generation (5G) wireless communication systems may benefit from differentiated service flows in a user plane that may or may not impact a core network.

Description of the Related Art

Due to the ever increasing nature of data traffic, radio access network (RAN) user plane congestion has become an increasingly important issue. In Long Term Evolution (LTE), user plane traffic is carried through virtual connections known as service flows located in data bearers. The increasing amount of data traffic causes congestion in these service flows.

Congestion occurs when a service that is delivered to a user over the default bearer or a dedicated bearer does not meet the user's expected service experience due to RAN user plane congestion. Increasing congestion in the service flows can often lead to the number of flows being increased.

Each service flow may have its own unique QoS characteristics, which means that QoS control may differ for each service flow. Additionally, QoS control may be in different levels such as RAN, core network (CN), and exchange-to-exchange (E2E). RAN level radio-link specific control may be independent from CN level backhauling connection specific control.

In current LTE architecture, to alleviate with the user plane congestion, different QoS class identifiers (QCI) values, having different priority levels, can be allocated to the bearers opened by different classes of subscribers.

The next generation of mobile communication systems, 5G, can also benefit from a method of service flow differentiation that will help alleviate congestion caused by the increasing nature of data traffic.

SUMMARY

According to certain embodiments, a method can include determining at a serving radio access network whether a modification of a service flow will impact at least one of a core network service monitoring, controlling, and configuring. The method also includes initiating, based on the determination, the modification of the service flow directly with a user equipment or through a controlling network entity located in the core network.

According to certain embodiments, a method can include receiving from a network entity a determination made in a serving radio access network of whether a modification of a service flow will impact at least one of a core network service monitoring, controlling, and configuring. The method also includes modifying, either directly or through a controlling network entity located in the core network, the service flow based on the determination.

An apparatus, according to certain embodiments, may include at least one processor and at least one memory including computer program code. The at least one memory and the computer program code are configured to, with the at least one processor, cause the apparatus to determine at a serving radio access network whether a modification of a service flow will impact at least one of a core network service monitoring, controlling, and configuring. The at least one memory and the computer program code are also configured to, with the at least one processor, cause the apparatus to initiate, based on the determination, the modification of the service flow directly with a user equipment or through a controlling network entity located in the core network.

An apparatus, according to certain embodiments, may include at least one processor and at least one memory including computer program code. The at least one memory and the computer program code are configured to, with the at least one processor, cause the apparatus to receive from a network entity a determination made in a serving radio access network of whether a modification of a service flow will impact at least one of a core network service monitoring, controlling, and configuring. The at least one memory and the computer program code are also configured to, with the at least one processor, cause the apparatus to modify, either directly or through a controlling network entity located in the core network, the service flow based on the determination.

According to certain embodiments, a non-transitory computer-readable medium encoding instructions that, when executed in hardware, performs a process. The process may include determining at a serving radio access network whether a modification of a service flow will impact at least one of a core network service monitoring, controlling, and configuring. The process may also include initiating, based on the determination, the modification of the service flow directly with a user equipment or through a controlling network entity located in the core network.

According to certain embodiments, a non-transitory computer-readable medium encoding instructions that, when executed in hardware, performs a process. The process may include receiving from a network entity a determination made in a serving radio access network of whether a modification of a service flow will impact at least one of a core network service monitoring, controlling, and configuring. The process may also include modifying, either directly or through a controlling network entity located in the core network, the service flow based on the determination.

An apparatus, according to certain embodiments, may include determining means for determining at a serving radio access network whether a modification of a service flow will impact at least one of a core network service monitoring, controlling, and configuring. The apparatus may also include means for initiating, based on the determination, the modification of the service flow directly with a user equipment or through a controlling network entity located in the core network.

An apparatus, according to certain embodiments, may means for receiving from a network entity a determination made in a serving radio access network of whether a modification of a service flow will impact at least one of a core network service monitoring, controlling and configuring. The apparatus may also include means for modifying, either directly or through a controlling network entity located in the core network, the service flow based on the determination.

BRIEF DESCRIPTION OF THE DRAWINGS

For proper understanding of the invention, reference should be made to the accompanying drawings, wherein.

DETAILED DESCRIPTION

Figure 1:
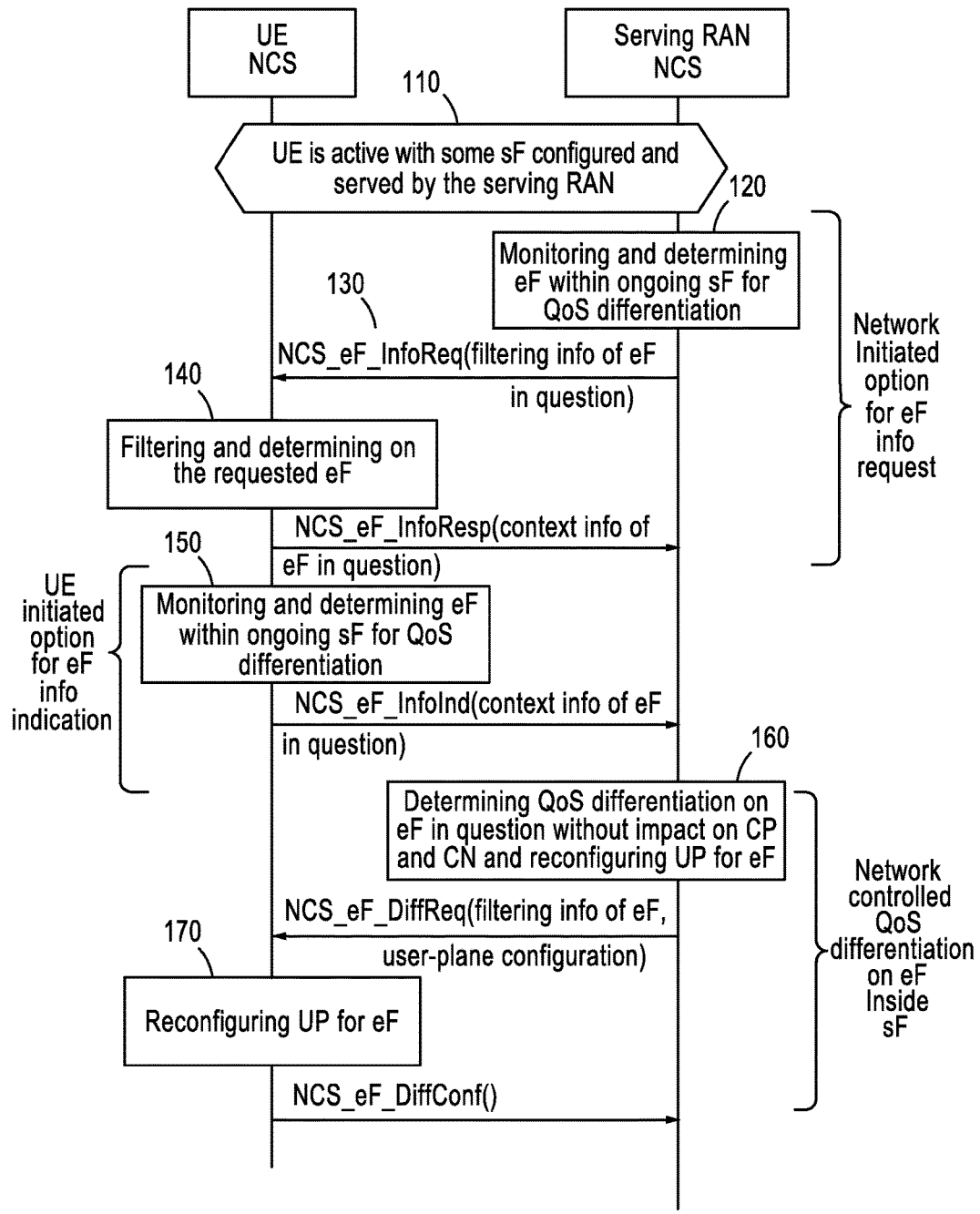
FIG. 1 illustrates a signal flow diagram according to certain embodiments.

Certain embodiments may facilitate an effective in-bearer QoS differentiation in a 5G multi-connectivity environment. Other embodiments may include triggers from user plane (UP) to control plane (CP) depending on the QoS differentiation.

The UP can be the part of the network which carries the user traffic and data packets. The CP, on the other hand, can carry signaling traffic and may be the part of the network responsible for routing user traffic. QoS differentiation may be used to allow for prioritization of different user traffic flow depending on the network load.

In certain embodiments, the term 5G service flow (SF) may refer to a logical connection in a 5G UP between an active user equipment (UE) and a serving user gateway (uGW). Such a connection may include a radio access link or connection between the UE and a serving RAN, and a transport network path between the serving RAN and the serving uGW. As such, 5G SF may be broader and more flexible than the evolved packet core (EPC) bearer of LTE, in terms of tunneling and mapping between EPC bearer and radio bearer, as well as the logical service flow resolution inside of the service flow.

An active UE may have one or more SF established toward one or more serving uGW. The establishment of the SF involves control from the control gateway (cGW).

In some embodiments, the SF may be local, meaning that it may not be routed through the serving uGW, but instead routed through an optional local gateway functionality closer to RAN. Such a local gateway can be located between in the uGW and RAN.

Further, the SF may have at least one elementary flow (eF), which may be the finer or lower levels of the SF resolution. In 50, individual eF levels can be filtered, monitored, and controlled. As such, in certain embodiment, eF levels can play a role in a QoS or Quality of Experience (QoE) control framework. There may be tens or hundreds of eFs within a single SF, especially in a multi-connectivity RAN environment.

In certain embodiments, a group or subset of eFs with the SF which have at least one common predefined attribute can be termed a 5G sub-flow (sF). In some embodiments, a single sF may have tens or hundreds of eFs, particularly in a multi-connectivity RAN environment.

Certain embodiments help facilitate quality of service at high levels. Specifically, certain embodiments enable an effective implementation of in-bearer QoS differentiation in a multi-connectivity RAN environment having at least one eF. In addition, clear and efficient UP and CP splits are provided to help control the SF, eF and sF between the UE and the network.

The CP may configure and control the UP on both SF and sF levels. The contexts of SF and sF, therefore, as well as link management mapping between SF and sF on RAN and CN levels, may be established and maintained by the CP. In some embodiments, from a RAN point of view sFs are similar to radio bearers of Evolved Universal Terrestrial Radio Access Network (E-UTRAN), since they are configured to serve RAN for RAN level transmission and QoS control.

In certain embodiments, a determination can be made at a serving radio access network as to whether a modification of an SF will impact a core network service monitoring. Based on such a determination, the modification may be initiated directly with a user equipment, or alternatively through a controlling network entity located in the core network. Modification, in certain embodiments, may involve rearranging the eFs between service flows based on the determination.

In certain other embodiments, in-bearer, in-SF, or in-sF QoS differentiation occurs on the individual eF levels. eF levels are kept within the UP and are primarily managed and controlled by the network conversion sub-layer (NCS) for some RAN level. NCS can be considered an extended and enhanced 5G variant of Packet Data Conversion Protocol (PDCP) in E-UTRAN. A UP master QoS handling entity in the CN, such as uGW, may also be used to manage and control both CN and RAN. In some embodiments, therefore, CP may not maintain context of individual eFs. This allows for the flexible handling of UP with possible in-bearer QoS differentiation. An example of the flexibility implementation of such an embodiment, from a transport bearer service perspective, involves a simple plain option of having 1 SF mapped on 1 sF and no eF per UE. Another example involves a more advanced option of having L number of SFs mapped on M number of sFs with N number of eFs getting certain QoS differentiation treatment per UE.

Further, certain embodiments provide the in-bearer QoS differentiation with a clear enough CP or UP resolution. Such resolution ensures that the QoS differentiation does not cause a significant level of additional complexity or overhead to the CP.

In other embodiments, CP may assist UP in signaling eF related control information between the serving RAN or CN and the UE, as triggered and requested by the UP. In such an embodiment, the UP triggers the CP to assist in signaling eF control information, and in the actual controlling of the eF. The triggering and requesting may involve a Network Conversion Sub-layer of L2 (NCS) in RAN, or a UP master QoS handling entity in CN such as a user gateway (uGW). In requesting assistance from the CP, the UP may provide the CP with detailed information on the eF of interest, which may include radio resource control or non-access stratum, by the UP. The CP may then be triggered to provide assistance, and may provide such assistance during sF establishment, during which the related control information of expected eFs may be signaled. Alternatively, the UP may trigger the CP to assist when an eF requiring certain QoS differentiation treatment is identified by the UP, at which point the UP will send a request for assistance to the CP.

In a further embodiment, new UP control signaling procedures on at least one eF may be introduced to the NCS between the RAN and the UE using, for example, different NCS control protocol data units (C-PDUs) or NCS protocol data units (PDU) header fields. The eF lever control can then be kept within UP, and may not cause any notable impact on the CP.

FIG. 1 illustrates an embodiment of QoS differentiation in eF, and initiating modification of the eF, without having any impact on the CP or the CN. In step 110 the UE may be active with some sF having been configured, and can be served by a serving RAN NCS. In step 120, the serving RAN NCS can monitor and determine individual eFs in the UP, as well as corresponding eFs in another direction, which can be filtered out and selected for QoS differentiation treatment. The monitoring and determination on individual eFs may be based on at least one packet filtering attributes, such as packets' header information and progress on the filtered eF, such as throughput-delay or lifetime related information. In an embodiment in which NCS data PDUs carry service data units of IP based packets, the packets' header information may be extended to include information pertaining to IP based packets, such as source or destination IP addresses, port addresses, flow label, and differentiated services code points (DSCP), which can be found in the header of IP based packets.

The serving RAN NCS, in certain embodiments, may then request that the UE peer provide some advanced information on the filtered-out eF from the UE side in step 130. The UE may then filter and determine the requested detailed information of the eF, in step 140, and transmit the information to the RAN NCS with an indication of the specified information on the filtered-out eF. The specific information may include at least one of application information, expected remaining traffic volume or session life-time, E2E transport protocol related information, and corresponding feedback eF related information, such as transmission control protocol or internet protocol (TCP/IP) base applications.

In certain other embodiments, in step 150, the UE may be configured to monitor and determine on individual eFs, and then initiate the indication of specified information, as discussed above, to the serving network, without receiving an explicit request from the network side. In certain other embodiments, the UE may control or configure individual eFs without receiving an explicit request from the network side. The network may configure the UE with rules and threshold parameters, such at minimum size of the remaining application content to be transmitted or received, and expected session lifetime, to trigger the UE indication. In certain other embodiments, both the serving RAN NCS and the UE may be configured to monitor and determine individual eFs. Alternatively, the need for UE support and assistance can be made optional if advanced application relation information from the UE may not be needed or used. Advanced application related information may include application identification, expected data volume, and life time.

In step 160, the network side, based on the received eF information, may determine the actual QoS differentiation treatment of the eF, and also how to configure the eFs of the serving RAN and UE in order to carry out the determined QoS differentiation treatment.

In the embodiment of FIG. 1, QoS differentiation treatment may be conducted in the RAN level without requiring any CP-UP and RAN-CN interactions. In step 170, the UE reconfigures the eF within the UP according to the decided UP remapping or rerouting within the eF. In certain embodiments the UE remaps the eFs from the current corresponding sFs onto other established sFs of the UE, which have more suitable QoS attributes and constraints. Further, in the embodiments of step 170, no notable impact is made on the CP, and no change is exhibited by the identity contexts of those sFs. Instead, the NCS may use its own signaling procedure to configure this remapping or rerouting between the serving RAN and UE. In certain other embodiments the NCS may request RRC to configure this remapping or rerouting between the serving RAN and UE.

In a multi-connectivity environment, the UE may be served by more than one application protocol (AP), and therefore remapping and rerouting of the determined eF between two existing sFs may involve a change of AP.

In the embodiment of FIG. 1, the decided settings for the UP determine certain behaviors inside the current corresponding sF for the decided QoS differentiation treatment on the eF of interest. As discussed above, the NCS may use its own signaling procedure, or request RRC, to configure the remapping or rerouting between the serving RAN and UE. The behaviors may include a new RAN level setting for data buffering and/or buffer status reporting (BSR) associated with the eF and corresponding sF. The behavior may also include preserving contexts of the eF in connection mobility related to the corresponding sF.

In certain embodiments, when the UE indicates an expected data volume and session lifetime of the eF, the serving RAN may configure the UE to skip medium access control (MAC) level BSR on the eF and/or sF for a certain period of time, or until the UE receives further notice with some reconfiguration. In addition, MAC may be configured with a full-buffer model for the eF and/or sF when scheduling operations with or without some modified priority for the eF within the sF. In other embodiments, extended storage space may be reserved in the UE or the serving RAN in order to buffer and store data of the eF. In a more advanced application of the aware behavior, a new operation for supporting the transport layer connection corresponding to the eF may be provided. For example, a handover (HO) of the eF between serving APs may be provided.

Figure 2:
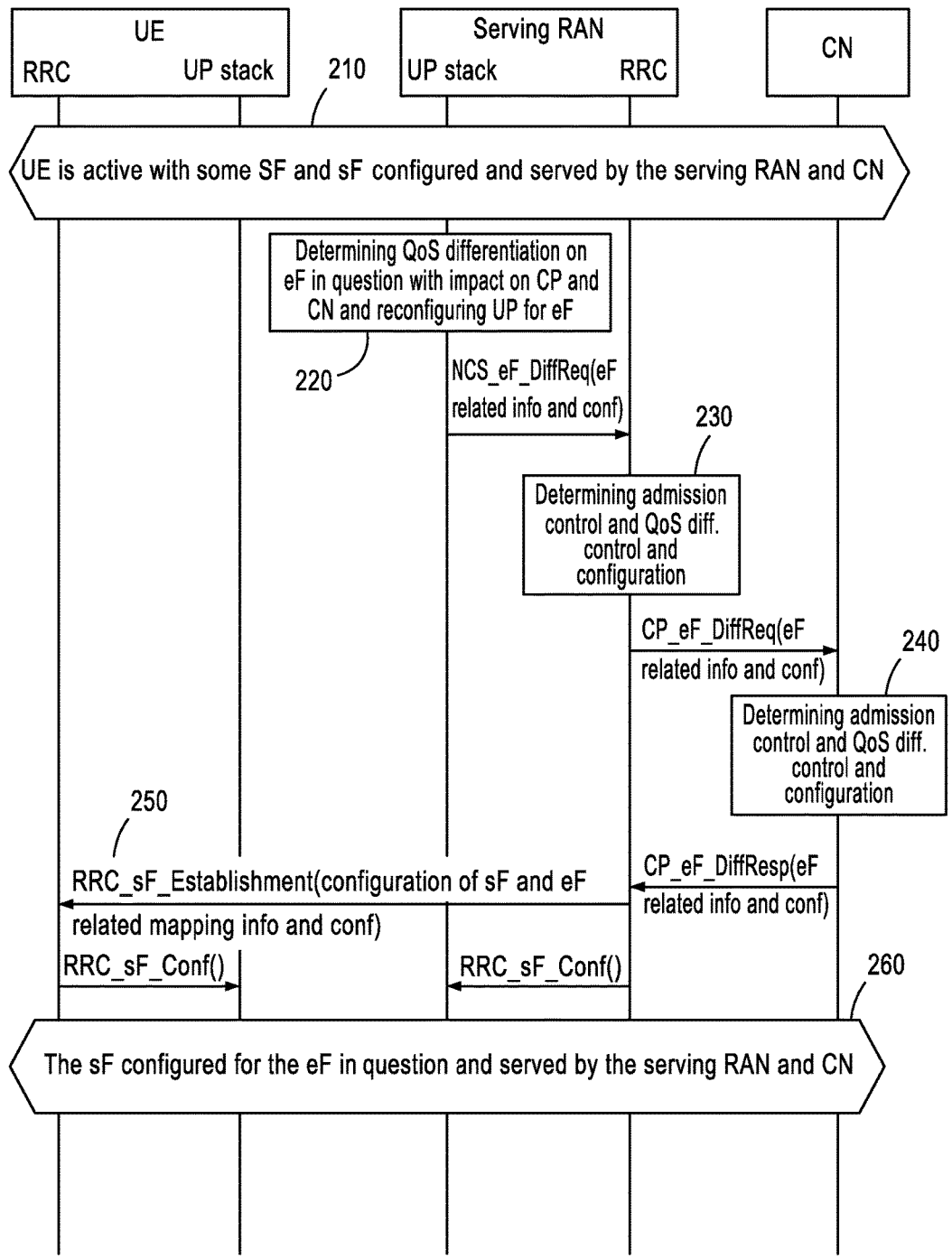
FIG. 2 illustrates a signal flow diagram according to certain embodiments.

In the embodiment of FIG. 2, the QoS differentiation treatment may lead to interactions between the CP and the UP and the RAN and the CN. Such interactions allow for treatments which involve both RAN and CN for E2E QoS/QoE control operation, and allow for possible UE negotiations as well as charging impacts on-the-fly.

In certain other embodiments, signaling procedures between the UE, the serving RAN, and the network may be introduced. The signaling procedures may include renegotiation, modification, or cancellation of the ongoing differentiation treatment on the determined eF. The signaling procedures may be either initiated by the UE or by the network using at least one of NCS, RRC, or NAS. In step 210, the UE is active with some SF and sF which are configured and served by the serving RAN and CN. Then, in step 220, the serving RAN can determine QoS differentiation on the eF in question with impact on CP and CN, and may reconfigure the UP for the eF in question.

Next, the UP can request that the CP set up a new sF service or logical channel for the determined eF, meaning that the determined eFs are upgraded to sFs, thereby splitting an existing sF. The UP request may be triggered by a serving network, either RAN or CN, which may utilize admission control from both RAN and CN. The serving network may include both the serving RAN and the CN. In the embodiment of FIG. 2, the UP request is triggered from the serving RAN. In this embodiment, the NCS may initiate the request via the master QoS handling entity (uGW) to cGW, which performs admission control and configure uGW and RAN for the requested sF. In another embodiment, NCS may request RRC to establish a new sF or logical channel for the determined eF. RRC may check with cGW for admission control if needed, and either RRC or cGW may configure UP for the new sF. In a multi-connectivity environment, the UE may be served by more than one AP. Therefore, setting a new sF, and mapping the determined eF on the new sF, may involve a change to the AP as well.

In step 230, the information is transmitted to the RRC, which may then determine admission control, QoS differentiation control, and configuration of an UE. The information is then transmitted to the CN, in step 240. A controlling network entity located in the CN may determine admission control, QoS differentiation control, and configuration of an UE. This information is then transmitted, in step 250, to the serving RAN, which transmits an RRC sF establishment message to the UE. In step 260, the sF is configured for the eF in question, and served by the serving RAN and CN.

Figure 3:
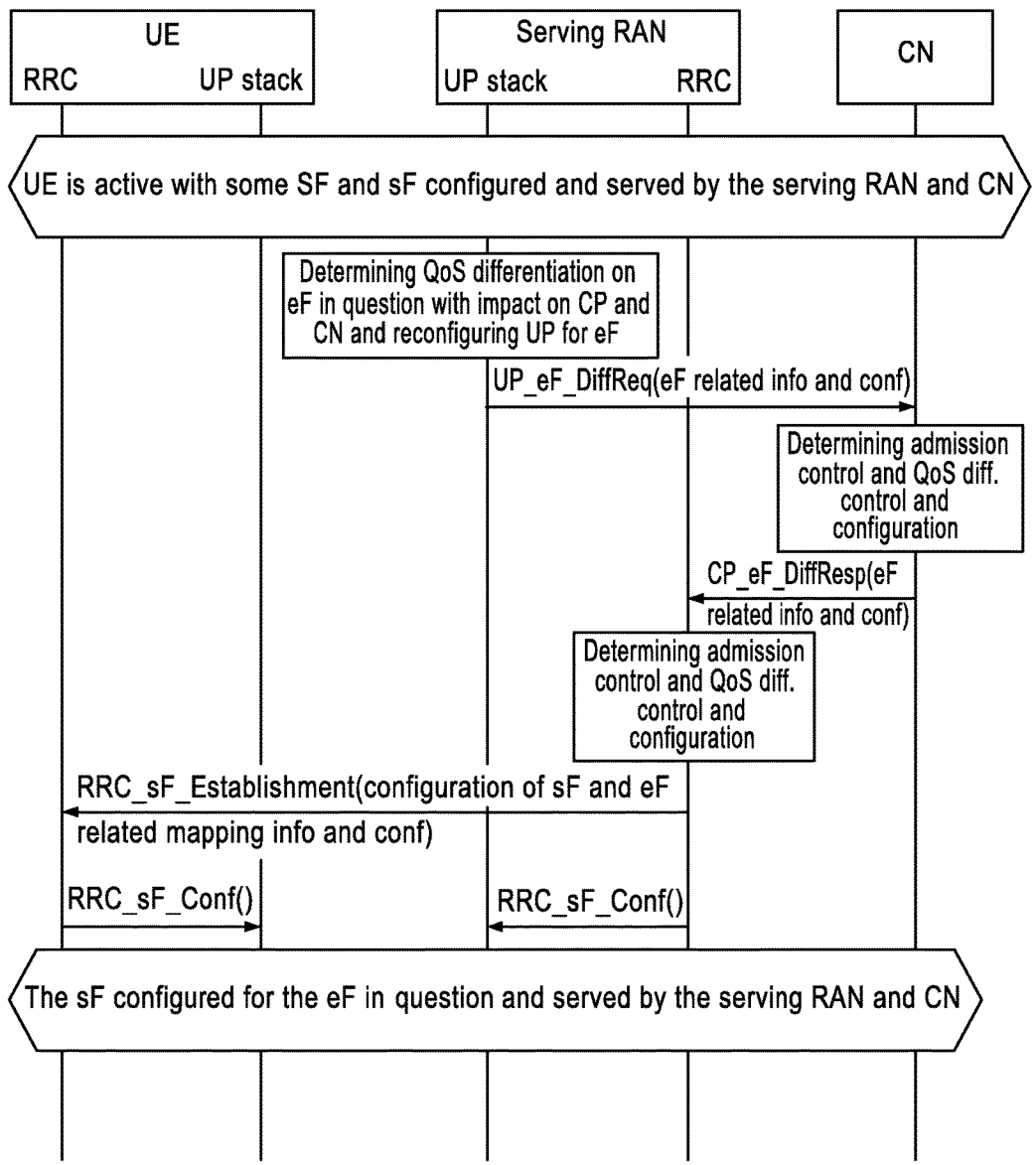
FIG. 3 illustrates a signal flow diagram according to certain embodiments.

Another embodiment of a QoS differentiation treatment requiring CP-UP and RAN-CN interaction is illustrated in FIG. 3. In FIG. 3, the CN, not the RAN, triggers the UP requesting CP to set up a new sF for the determined eF. Therefore, once the serving RAN determines QoS differentiation on the eF in question, with impact on CP and CN, the information is transmitted to the CN. The CN may then determine admission control, QoS differentiation control, and configuration, and transmit the information to the serving RAN. The serving RAN then transmits the information to the UE.

In other embodiments, the UP may request the CP to reconfigure some QoS attributed or constraints of the corresponding sF. The attributes or constraints may include, for example, data rate or priority level with a new cause due to the determined eF and treatment thereof.

Figure 4:
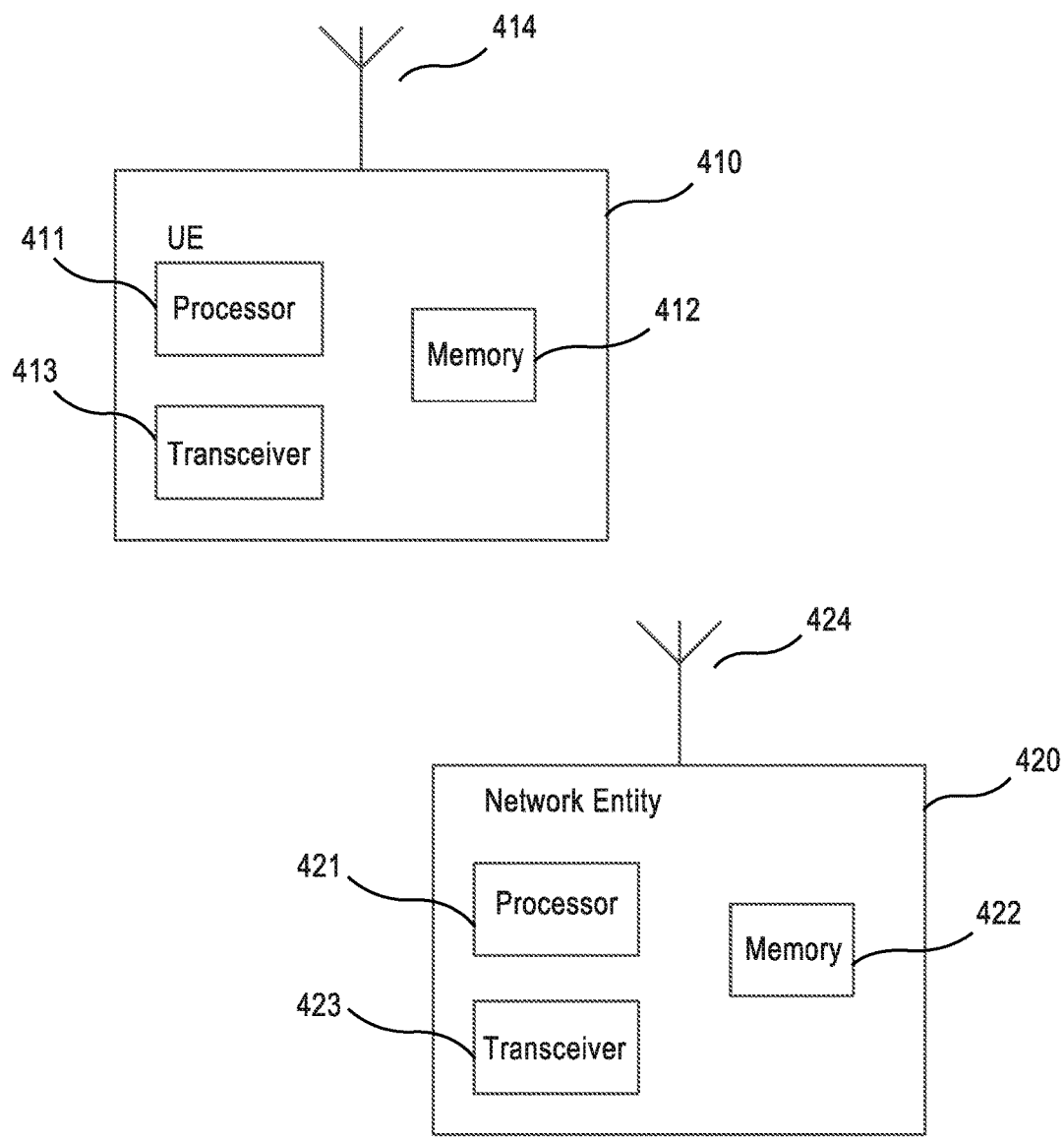
FIG. 4 illustrates a system according to certain embodiments.

FIG. 4 illustrates a system according to certain embodiments. It should be understood that each block of the flowchart of FIG. 1, 2, or 3, and any combination thereof, may be implemented by various means or their combinations, such as hardware, software, firmware, one or more processors and/or circuitry. In one embodiment, a system may include several devices, such as, for example, network node 420 and UE or user device 410. The system may include more than one UE 410 and more than one network node 420, although only one of each is shown for the purposes of illustration. A network node can be an access point, a base station, an eNB, server, host or any of the other network nodes discussed herein. Each of these devices may include at least one processor or control unit or module, respectively indicated as 421 and 411. At least one memory may be provided in each device, and indicated as 422 and 412, respectively. The memory may include computer program instructions or computer code contained therein. One or more transceiver 423 and 413 may be provided, and each device may also include an antenna, respectively illustrated as 424 and 414. Although only one antenna each is shown, many antennas and multiple antenna elements may be provided to each of the devices. Other configurations of these devices, for example, may be provided. For example, network node 420 and UE 410 may be additionally configured for wired communication, in addition to wireless communication, and in such a case antennas 424 and 414 may illustrate any form of communication hardware, without being limited to merely an antenna.

Transceivers 423 and 413 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 410 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

In some embodiment, an apparatus, such as a node or user device, may include means for carrying out embodiments described above in relation to FIG. 1, 2, or 3. In certain embodiments, at least one memory including computer program code can be configured to, with the at least one processor, cause the apparatus at least to perform any of the processes described herein.

In certain embodiments, the at least one memory and a computer program code are configured to, with the at least one processor, to cause an apparatus to determine at a serving radio access network whether a modification of a service flow will impact at least one of a core network service monitoring, controlling, and configuring, and initiate, based on the determination, the modification of the service flow directly with a user equipment or through a controlling network entity located in the core network.

In certain embodiments, the at least one memory and a computer program code are configured to, with the at least one processor, cause an apparatus to receive from a network entity a determination made in a serving radio access network of whether a modification of a service flow will impact at least one of a core network service monitoring, controlling, and configuring, and modify, either directly or through a controlling network entity located in the core network, the service flow based on the determination.

Processors 411 and 421 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 412 and 422 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network node 420 and/or UE 410, to perform any of the processes described above (see, for example, FIGS. 1, 2, and 3). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 4 illustrates a system including a network node 420 and a UE 410, certain embodiments may be applicable to other configurations, and configurations involving additional elements, as illustrated and discussed herein. For example, multiple user equipment devices and multiple network nodes may be present, or other nodes providing similar functionality, such as nodes that combine the functionality of a user equipment and an access point, such as a relay node. The UE 410 may likewise be provided with a variety of configurations for communication other than communication network node 420. For example, the UE 410 may be configured for device-to-device and/or machine type communications.

The QoS differentiation on a TCP/IP based eF may consider the corresponding feedback eF, as discussed above. In certain embodiments, the serving network may determine and configure the UE to modify the transport protocol on a determined eF between the UE and serving uGW, such as TCP to UDP, for differentiation purposes as determined by the serving network.

In certain other embodiments, for reducing explicit control signaling overhead, eFs may be characterized and categorized beforehand with designated profile identities corresponding to different kings of QoS treatment. In addition, in certain embodiments individual eFs, which are filtered out for QoS differentiation, may be assigned with unique IDs configured to relevant network nodes and UE for addressing purposes. Control signaling on eF for QoS differentiation may be based on two configured information elements: eF ID and QoS profile ID.

The features, structures, or characteristics of certain embodiments described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

| Partial Glossary | |
| --- | --- |
| LTE | Long-Term Evolution |
| BSR | Buffer Status Report |
| UE | User Equipment |
| RRC | Radio Resource Control |
| AP | Access Point |
| CP | Control Plane |

| Partial Glossary | |
| --- | --- |
| HO | Handover |
| RB | Radio Bearers |
| NCS | Network Conversion Sub-layer of L2 |
| QoS | Quality of Service |
| SF | Service Flow |
| sF | Sub-Flow |
| eF | Elementary Flow |
| MAC | Medium Access Control |
| uGW | User Gateway |
| cGW | Control Gateway |

We claim:

1. An apparatus comprising:
   at least one memory comprising computer program code;
   at least one processor;
   wherein the at least one memory and the computer program code are configured, with the at least one processor, to cause the apparatus at least to:
   determine at a serving radio access network whether a modification of a service flow will impact at least one of a core network service monitoring, controlling, and configuring;
   initiate, based on the determination, the modification of the service flow directly with a user equipment when the modification will not impact the core network; and
   initiate, based on the determination, the modification of the service flow through a controlling network entity located in the core network when the modification will impact the core network.

2. The apparatus of claim 1, wherein the determination occurs in an elementary flow level.

3. The apparatus of claim 2, wherein a control plane does not maintain contexts of the individual elementary flow level.

4. The apparatus of claim 2, wherein the modification involves a user plane requesting that a control plane set up a new sub-flow service or logical channel for at least one elementary flow level.

5. The apparatus of claim 2, wherein the modification involves a user plane remapping or rerouting within the user plane the elementary flow levels onto established sub-flows or logical channels of the user equipment.

6. The apparatus of claim 2, wherein the serving radio access network requests that the user equipment transmit information of the elementary flow level.

7. The apparatus of claim 2, wherein the user equipment transmits to the serving radio access network information of the elementary flow level, without the serving radio access network requesting the information.

8. The apparatus of claim 1, wherein the determination utilizes quality of service (QoS) differentiation.

9. The apparatus of claim 1, wherein the at least one memory and the computer program code are configured, with the at least one processor, to further cause the apparatus at least to:
   request that a control plane assist a user plane in signaling control information between the user equipment and the serving radio access network.

10. The apparatus of claim 9, wherein a serving radio access network triggers the request.

11. The apparatus of claim 1, wherein the determining is kept within a user plane.

12. The apparatus of claim 1, wherein the at least one memory and the computer program code are configured, with the at least one processor, to further cause the apparatus at least to:
provide the modification information directly to a control plane from a user plane.

13. The apparatus of claim 1, wherein the modification is controlled by the controlling network entity located in the core network for both the core network and the serving radio access network.

14. An apparatus comprising:
at least one memory comprising computer program code;
at least one processor;
wherein the at least one memory and the computer program code are configured, with the at least one processor, to cause the apparatus at least to:
determine at a serving radio access network whether a modification of a service flow will impact at least one of a core network service monitoring, controlling, and configuring; and
initiate, based on the determination, the modification of the service flow directly with a user equipment or through a controlling network entity located in the core network,
wherein the modification is initiated directly with the user equipment and kept within a user plane is controlled by Network Conversion Sub-layer (NCS) of the serving radio access network.

15. An apparatus comprising:
at least one memory comprising computer program code;
at least one processor;
wherein the at least one memory and the computer program code are configured, with the at least one processor, to cause the apparatus at least to:
receive from a network entity a determination made in a serving radio access network of whether a modification of a service flow will impact at least some of a core network service monitoring, controlling, and configuring;
modify, based on the determination, the service flow directly when the modification will not impact the core network;
modify based on the determination, the service flow through a controlling network entity located in the core network, when the modification will impact the core network.

16. The apparatus of claim 15, wherein the determination occurs in an elementary flow level.

17. The apparatus of claim 16, wherein a control plane does not maintain contexts of the individual elementary flow level.

18. The apparatus of claim 15, wherein the determination utilizes quality of service (QoS) differentiation.

19. The apparatus of claim 15, wherein the determining is kept within a user plane.

* * * * *